(12) United States Patent
Yamaji et al.

(10) Patent No.: US 11,247,265 B2
(45) Date of Patent: Feb. 15, 2022

(54) IRON POWDER, SILICON OXIDE COATED IRON POWDER,, MOLDED ARTICLE FOR INDUCTOR, AND INDUCTOR

(71) Applicant: DOWA ELECTRONICS MATERIALS CO., LTD., Tokyo (JP)

(72) Inventors: Hidenori Yamaji, Tokyo (JP); Masahiro Gotoh, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 16/316,060

(22) PCT Filed: Jul. 10, 2017

(86) PCT No.: PCT/JP2017/025136
§ 371 (c)(1),
(2) Date: Jan. 8, 2019

(87) PCT Pub. No.: WO2018/012458
PCT Pub. Date: Jan. 18, 2018

(65) Prior Publication Data
US 2019/0210104 A1    Jul. 11, 2019

(30) Foreign Application Priority Data

| | | |
|---|---|---|
| Jul. 15, 2016 | (JP) | JP2016-140127 |
| Oct. 20, 2016 | (JP) | JP2016-206169 |
| Apr. 17, 2017 | (JP) | JP2017-081143 |

(51) Int. Cl.
*B22F 1/00* (2006.01)
*B22F 1/02* (2006.01)
(Continued)

(52) U.S. Cl.
CPC .............. *B22F 1/0007* (2013.01); *B22F 1/00* (2013.01); *B22F 1/02* (2013.01); *B22F 3/00* (2013.01);
(Continued)

(58) Field of Classification Search
CPC .. C01G 49/06; C22C 38/00; Y10T 428/12181
(Continued)

(56) References Cited

U.S. PATENT DOCUMENTS

| | | | | |
|---|---|---|---|---|
| 2010/0000769 A1* | 1/2010 | Ohmi | ....................... | H01F 1/26 174/255 |
| 2011/0159181 A1* | 6/2011 | Kaneko | ................ | B22F 1/0062 427/214 |

FOREIGN PATENT DOCUMENTS

| | | |
|---|---|---|
| JP | 60-011300 | 1/1985 |
| JP | 2006-249528 | 9/2006 |

(Continued)

OTHER PUBLICATIONS

Y. Sugawa et al., "Carbonyl-iron/epoxy composite magnetic . . . package-level power grid", 12$^{th}$ MMM/Intermag Conference, Contributed Paper, HU-04, 2013.

*Primary Examiner* — Humera N. Sheikh
*Assistant Examiner* — Katherine A Christy
(74) *Attorney, Agent, or Firm* — Clark & Brody LP

(57) ABSTRACT

An iron powder and method of making an iron powder. The method includes a step of neutralizing an acidic aqueous solution containing a trivalent iron ion and a phosphorus-containing ion, with an alkali aqueous solution, so as to provide a slurry of a precipitate of a hydrated oxide, or a step of adding a phosphorus-containing ion to a slurry containing a precipitate of a hydrated oxide obtained by neutralizing an acidic aqueous solution containing a trivalent iron ion with an alkali aqueous solution. A silane compound is added to (Continued)

the slurry so as to coat a hydrolysate of the silane compound on the precipitate of the hydrated oxide. The precipitate of the hydrated oxide after coating is recovered through solid-liquid separation, the recovered precipitate is heated to provide iron particles coated with a silicon oxide, and a part or the whole of the silicon oxide coating is dissolved and removed.

11 Claims, 2 Drawing Sheets

(51) Int. Cl.
*C01G 49/06* (2006.01)
*H01F 1/20* (2006.01)
*B22F 9/22* (2006.01)
*B22F 3/00* (2021.01)
*C22C 38/00* (2006.01)
*H01F 1/24* (2006.01)
*B22F 9/04* (2006.01)

(52) U.S. Cl.
CPC .................. *B22F 9/04* (2013.01); *B22F 9/22* (2013.01); *C01G 49/06* (2013.01); *C22C 38/00* (2013.01); *H01F 1/20* (2013.01); *H01F 1/24* (2013.01); *B22F 2009/044* (2013.01); *B22F 2301/35* (2013.01); *B22F 2302/256* (2013.01); *C01P 2004/54* (2013.01); *C01P 2006/20* (2013.01); *C01P 2006/42* (2013.01); *Y10T 428/12181* (2015.01)

(58) Field of Classification Search
USPC ......................................................... 428/570
See application file for complete search history.

(56) References Cited

FOREIGN PATENT DOCUMENTS

| | | |
|---|---|---|
| JP | 2009-114505 | 5/2009 |
| JP | 2010-024478 | 2/2010 |
| JP | 2014-060284 | 4/2014 |
| JP | 2016-014162 | 1/2016 |
| WO | 2008/149785 | 12/2008 |

* cited by examiner

[Fig.1]
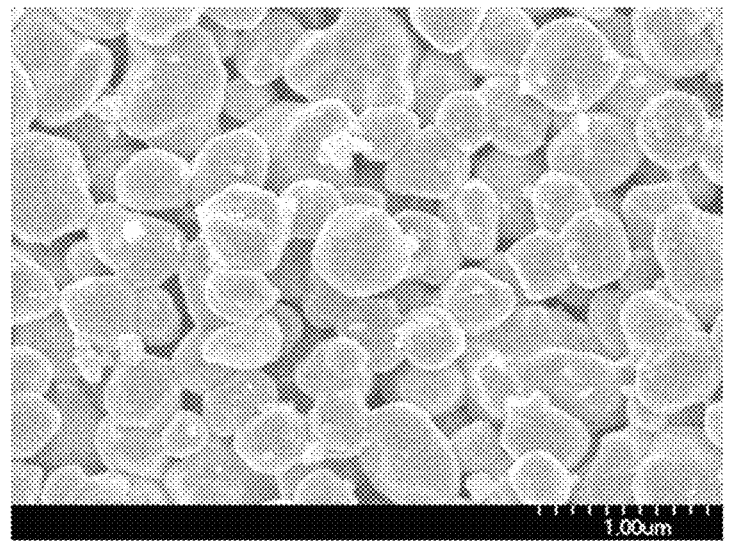
[Fig.2]
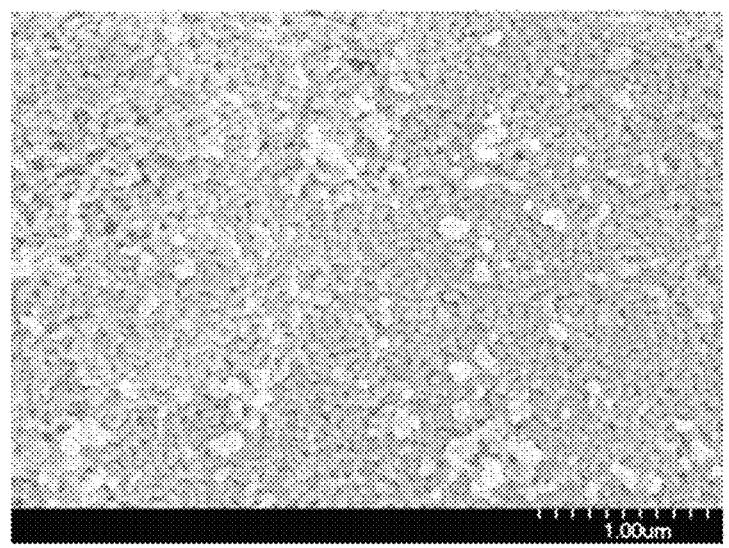

[Fig.3]
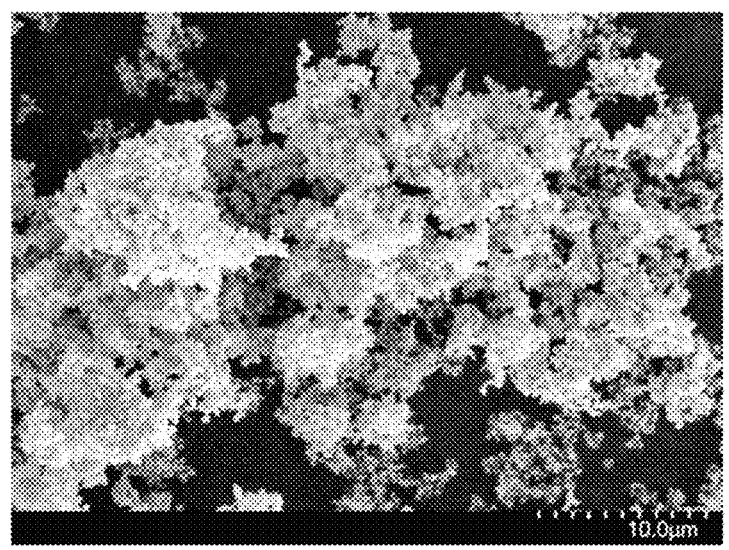

IRON POWDER, SILICON OXIDE COATED IRON POWDER, MOLDED ARTICLE FOR INDUCTOR, AND INDUCTOR

TECHNICAL FIELD

The present invention relates to iron powder and iron powder coated with a silicon oxide that have a large real part $\mu'$ and a small loss factor (tan $\delta$) of a complex relative permeability, and a method for producing them.

BACKGROUND ART

Powder of a ferrous metal, which is a magnetic material, has been used as a magnetic core of an inductor in the form of a molded green compact. Known examples of the ferrous metal include powder of a ferrous alloy, such as an Fe based amorphous alloy containing large amounts of Si and B (PTL 1), an Fe—Si—Al based Sendust alloy, and a permalloy (PTL 2), and carbonyl iron powder (NPL 1). These kinds of ferrous alloy powder have been formed into a coating material as a complex with an organic resin and used for production of a surface mounting coil member (PTL 2).

A power inductor, which is one of inductors, is being used with an increased frequency, and an inductor that is capable of being used with a high frequency of 100 MHz or more is being demanded. The power inductor used at 100 MHz or more requires a material that has a high real part $\mu'$ of the complex relative permeability and a small loss factor tan $\delta$ ($=\mu''/\mu'$) of the complex relative permeability at 100 MHz or more. However, ferrous metal powder produced by the atomizing method has a large tan $\delta$ at 100 MHz or more, and the carbonyl iron powder having an average diameter of 1.1 $\mu$m introduced in NPL 1 has tan $\delta$ at 100 MHz of from 0.03 to 0.04, which cannot be said to be sufficient for the high frequency application. Accordingly, under the present circumstances, a material that satisfies both a high $\mu'$ and a low tan $\delta$ at 100 MHz has not yet been obtained.

CITATION LIST

Patent Literatures

PTL 1: JP-A-2016-014162
PTL 2: JP-A-2014-060284
PTL 3 WO 2008/149785
PTL 4: JP-A-60-011300

Non-Patent Literature

NPL 1: Yuichiro Sugawa et al., 12th MMM/INTERMAG CONFERENCE, CONTRIBUTED PAPER, HU-04, final manuscript

SUMMARY OF INVENTION

Technical Problem

As described in the foregoing, there have been demands of iron powder that satisfies both a high $\mu'$ and a low tan $\delta$ suitable for the application to a power inductor used at 100 MHz or more, and a method for producing the same. The atomizing method, which is a production method of metal powder for the ordinary power inductor application, cannot provide a product satisfying tan $\delta$ due to the large size of the produced particles. A known method for producing metal powder having a small particle size includes the production method of magnetic powder used for a coated magnetic recording medium, such as a videotape, obtained by reducing iron oxide powder produced by a wet method, but the magnetic powder produced by the production method is formed of acicular crystals having a large aspect ratio (axial ratio), has a major axial length of approximately 0.2 $\mu$m, and has a problem that $\mu'$ cannot be increased due to the high magnetic anisotropy thereof. PTL 3 describes a method for producing iron oxide powder having a small aspect ratio by a wet method, but the iron oxide powder obtained by the production method has an average particle diameter of approximately several tens of nanometers, and it is estimated that iron powder obtained through reduction thereof has a low $\mu'$. PTL 4 describes a technique for providing iron powder in such a manner that oxyhydroxide crystals formed in the presence of a phosphate ion are coated with a silicon oxide and then reduced to provide iron particles. The coating of iron powder with a silicon oxide is effective for decreasing the eddy current loss and decreasing tan $\delta$ but since the technique described in PTL 4 uses acicular oxyhydroxide as the seed crystals, the resulting crystals are also acicular crystals, and the details of the silicon oxide coating are unclear.

It has been investigated that the aforementioned production methods of iron powder by a wet method are improved to achieve the production of iron powder having a large average particle diameter, but metal powder of 0.2 $\mu$m or more cannot be produced. A method for increasing the particle size by performing a heat treatment at a high temperature has also been considered, but the method has a problem that the particles are sintered to increase tan $\delta$.

In view of the aforementioned problems, an object of the invention is to provide iron powder and iron powder coated with a silicon oxide that have a sufficiently large $\mu'$ and a sufficiently small tan $\delta$ by controlling the average particle diameter and the average axial ratio of the iron powder, and a method for producing them.

Solution to Problem

For achieving the objects, the invention provides iron powder containing iron particles having an average particle diameter of 0.25 $\mu$m or more and 0.80 $\mu$m or less and an average axial ratio of 1.5 or less, and silicon oxide-coated iron powder containing the iron particles having coated on a surface thereof a silicon oxide.

The iron powder preferably has a volume based 50% cumulative particle diameter measured by a Microtrac particle size distribution measuring equipment of 1.2 $\mu$m or less, and may have a volume based 90% cumulative particle diameter measured by a Microtrac particle size distribution measuring equipment of 2.0 $\mu$m or less.

The iron powder preferably has a real part $\mu'$ of a complex relative permeability of 4 or more and a loss factor tan $\delta$ of a complex relative permeability of 0.025 or less, measured at 100 MHz, for a molded article obtained by mixing the iron powder and a bisphenol F type epoxy resin at a mass ratio of 9/1 and pressure-molding the mixture.

The silicon oxide-coated iron powder preferably has a real part $\mu'$ of a complex relative permeability of 2 or more and a loss factor tan $\delta$ of a complex relative permeability of 0.025 or less, measured at 100 MHz, for a molded article obtained by mixing the iron powder and a bisphenol F type epoxy resin at a mass ratio of 9/1 and pressure-molding the mixture.

The iron powder preferably contains P in an amount of 0.1% by mass or more and 1.0% by mass or less based on the mass of the iron powder.

The silicon oxide-coated iron powder preferably has an amount of the silicon oxide coated of 15% by mass or less in terms of silicon based on the total mass of the silicon oxide-coated iron powder, and preferably contains P in an amount of 0.1% by mass or more and 2.0% by mass or less based on the total mass of the silicon oxide-coated iron powder.

The invention also provides a method for producing iron powder containing iron particles having an average particle diameter of 0.25 μm or more and 0.80 μm or less and an average axial ratio of 1.5 or less, and silicon oxide-coated iron powder containing the iron particles having coated on a surface thereof a silicon oxide, and a method for producing a precursor of them.

Specifically, a method for producing a precursor of iron powder and silicon oxide-coated iron powder is provided, which is a method for producing a precursor of silicon oxide-coated iron powder containing iron particles having an average particle diameter of 0.25 μm or more and 0.80 μm or less and an average axial ratio of 1.5 or less having coated on a surface thereof a silicon oxide, the method including: a step of neutralizing an acidic aqueous solution containing a trivalent iron ion and one or more kind of an ion selected from a phosphate ion, a phosphite ion, and a hypophosphite ion (which is hereinafter referred to as a phosphorus-containing ion), with an alkali aqueous solution, so as to provide a slurry of a precipitate of a hydrated oxide; a step of adding a silane compound to the resulting slurry, so as to coat a hydrolysate of the silane compound on the precipitate of the hydrated oxide; a step of recovering the precipitate of the hydrated oxide coated with the hydrolysate of the silane compound, through solid-liquid separation; and a step of heating the recovered precipitate of the hydrated oxide coated with the hydrolysate of the silane compound, so as to provide iron oxide particles coated with a silicon oxide.

In the method for producing a precursor, it is possible that the phosphorus-containing ion is added, after forming the precipitate of the hydrated oxide, to the slurry of the hydrated oxide, and thereafter the hydrolysate of the silane compound is coated. It is also possible that the phosphorus-containing ion is added, after forming the precipitate of the hydrated oxide, thereto in coating the hydrolysate of the silane compound during a period of from the start of addition of the silane compound to the end of addition thereof.

The silicon oxide-coated iron oxide powder obtained in the aforementioned production method as a precursor may be heated in a reducing atmosphere, so as to provide silicon oxide-coated iron powder. The resulting silicon oxide-coated iron powder preferably has a real part t' of a complex relative permeability of 2 or more and a loss factor tan δ of a complex relative permeability of 0.025 or less, measured at 100 MHz, for a molded article obtained by mixing the silicon oxide-coated iron powder and a bisphenol F type epoxy resin at a mass ratio of 9/1 and pressure-molding the mixture.

The silicon oxide-coated iron powder obtained by the production method has high chemical activity, and thus is preferably stabilized through a gradual oxidation treatment described later.

It is possible that the silicon oxide-coated iron oxide powder obtained by the production method is immersed in an alkali aqueous solution, so as to dissolve partially the silicon oxide coating for controlling the amount thereof coated. The silicon oxide coating may be completely dissolved to provide iron powder having no silicon oxide coating. The iron powder obtained by dissolving the silicon oxide coating is preferably pulverized depending on the application, and the pulverization is preferably performed with a jet mill pulverizer.

The invention also provides a molded article for an inductor containing the iron powder or the silicon oxide-coated iron powder having been molded, and an inductor.

More specifically, the description herein includes the following inventions.

[1] Iron powder containing iron particles having an average particle diameter of 0.25 μm or more and 0.80 μm or less and an average axial ratio of 1.5 or less.

[2] The iron powder according to the item [1], wherein the iron powder has a content of P of 0.1% by mass or more and 1.0% by mass or less based on the mass of the iron powder.

[3] The iron powder according to the item [1] or [2], wherein the iron powder has a volume based 50% cumulative particle diameter measured by a Microtrac particle size distribution measuring equipment of 1.2 μm or less.

[4] The iron powder according to any one of the items [1] to [3], wherein the iron powder has a volume based 90% cumulative particle diameter measured by a Microtrac particle size distribution measuring equipment of 2.0 μm or less.

[5] The iron powder according to any one of the items [1] to [4], wherein the iron powder has a real part p' of a complex relative permeability of 4 or more and a loss factor tan δ of a complex relative permeability of 0.025 or less, measured at 100 MHz, for a molded article obtained by mixing the iron powder and a bisphenol F type epoxy resin at a mass ratio of 9/1 and pressure-molding the mixture.

[6] Silicon oxide-coated iron powder containing the iron particles according to the item [1], having coated on a surface thereof a silicon oxide.

[7] The silicon oxide-coated iron powder according to the item [6] wherein the silicon oxide-coated iron powder has a real part μ' of a complex relative permeability of 2 or more and a loss factor tan δ of a complex relative permeability of 0.025 or less, measured at 100 MHz, for a molded article obtained by mixing the silicon oxide-coated iron powder and a bisphenol F type epoxy resin at a mass ratio of 9/1 and pressure-molding the mixture.

[8] The silicon oxide-coated iron powder according to the item [6] or [7] wherein the silicon oxide-coated iron powder has an amount of the silicon oxide coated of 15% by mass or less in terms of silicon based on the total mass of the silicon oxide-coated iron powder.

[9] The silicon oxide-coated iron powder according to the item [6] wherein the silicon oxide-coated iron powder has a content of P of 0.1% by mass or more and 2.0% by mass or less based on the total mass of the silicon oxide-coated iron powder.

[10] A method for producing a precursor of silicon oxide-coated iron powder, which is a method for producing a precursor of silicon oxide-coated iron powder containing iron particles having an average particle diameter of 0.25 μm or more and 0.80 μm or less and an average axial ratio of 1.5 or less having coated on a surface thereof a silicon oxide, the method including:

a step of neutralizing an acidic aqueous solution containing a trivalent iron ion and one or more kind of an ion selected from a phosphate ion, a phosphite ion, and a hypophosphite ion (which is hereinafter referred to as a phosphorus-containing ion), with an alkali aqueous solution, so as to provide a slurry of a precipitate a hydrated oxide;

a step of adding a silane compound to the resulting slurry, so as to coat a hydrolysate of the silane compound on the precipitate of the hydrated oxide;

a step of recovering the precipitate of the hydrated oxide coated with the hydrolysate of the silane compound, through solid-liquid separation; and a step of heating the recovered precipitate of the hydrated oxide coated with the hydrolysate of the silane compound, so as to provide iron oxide powder coated with a silicon oxide.

[11] A method for producing a precursor of silicon oxide-coated iron powder, which is a method for producing a precursor of silicon oxide-coated iron powder containing iron particles having an average particle diameter of 0.25 µm or more and 0.80 µm or less and an average axial ratio of 1.5 or less having coated on a surface thereof a silicon oxide, the method including:

a step of neutralizing an acidic aqueous solution containing a trivalent iron ion, with an alkali aqueous solution, so as to provide a slurry of a precipitate of a hydrated oxide;

a step of adding a phosphorus-containing ion to the slurry;

a step of adding a silane compound to the slurry containing the precipitate of the hydrated oxide having the phosphorus-containing ion added thereto, so as to coat a hydrolysate of the silane compound on the precipitate of the hydrated oxide;

a step of recovering the precipitate of the hydrated oxide coated with the hydrolysate of the silane compound, through solid-liquid separation; and a step of heating the recovered precipitate of the hydrated oxide coated with the hydrolysate of the silane compound, so as to provide iron oxide particles coated with a silicon oxide.

[12] A method for producing a precursor of silicon oxide-coated iron powder, which is a method for producing a precursor of silicon oxide-coated iron powder containing iron particles having an average particle diameter of 0.25 µm or more and 0.80 µm or less and an average axial ratio of 1.5 or less having coated on a surface thereof a silicon oxide, the method including:

a step of neutralizing an acidic aqueous solution containing a trivalent iron ion, with an alkali aqueous solution, so as to provide a slurry of a precipitate of a hydrated oxide;

a step of adding a silane compound to the slurry containing the precipitate of the hydrated oxide, at which a phosphorus-containing ion is further added during a period of from start of addition of the silane compound to end of addition thereof, so as to coat a hydrolysate of the silane compound on the precipitate of the hydrated oxide in the presence of the phosphorus-containing ion;

a step of recovering the precipitate of the hydrated oxide coated with the hydrolysate of the silane compound, through solid-liquid separation; and a step of heating the recovered precipitate of the hydrated oxide coated with the hydrolysate of the silane compound, so as to provide iron oxide powder coated with a silicon oxide.

[13] A method for producing silicon oxide-coated iron powder, which is a method for producing silicon oxide-coated iron powder containing iron particles having an average particle diameter of 0.25 µm or more and 0.80 µm or less and an average axial ratio of 1.5 or less having coated on a surface thereof a silicon oxide, the method including: a step of heating iron oxide powder coated with a silicon oxide obtained by the method for producing a precursor of silicon oxide-coated iron powder according to any one of the items [10] to [12], in a reducing atmosphere.

[14] The method for producing silicon oxide-coated iron powder according to the item [13], wherein the silicon oxide-coated iron powder has a real part $\mu'$ of a complex relative permeability of 2 or more and a loss factor tan $\delta$ of a complex relative permeability of 0.025 or less, measured at 100 MHz, for a molded article obtained by mixing the silicon oxide-coated iron powder and a bisphenol F type epoxy resin at a mass ratio of 9/1 and pressure-molding the mixture.

[15] A method for producing silicon oxide-coated iron powder, including: a step of immersing silicon oxide-coated iron powder obtained by the method for producing silicon oxide-coated iron powder according to the item [13], in an alkali aqueous solution, so as to dissolve the silicon oxide coating for controlling the amount thereof coated.

[16] The method for producing silicon oxide-coated iron powder according to the item [15], wherein the silicon oxide-coated iron powder has a real part $\mu'$ of a complex relative permeability of 2 or more and a loss factor tan $\delta$ of a complex relative permeability of 0.025 or less, measured at 100 MHz, for a molded article obtained by mixing the silicon oxide-coated iron powder and a bisphenol F type epoxy resin at a mass ratio of 9/1 and pressure-molding the mixture.

[17] A method for producing iron powder, which is a method for producing iron powder containing iron particles having an average particle diameter of 0.25 µm or more and 0.80 µm or less and an average axial ratio of 1.5 or less, the method including: a step of immersing silicon oxide-coated iron powder obtained by the method for producing silicon oxide-coated iron powder according to any one of the items [13] to [16] in an alkali aqueous solution, so as to dissolve the silicon oxide coating.

[18] A method for producing iron powder, including: a step of pulverizing iron powder obtained by the production method according to the item [17].

[19] The method for producing iron powder according to the item [18] wherein the pulverizing step is performed with a jet mill pulverizer.

[20] The method for producing iron powder according to the item [18] or [19] wherein the pulverizing step is performed to make a volume based 50% cumulative particle diameter of the iron powder measured by a Microtrac particle size distribution measuring equipment of 1.2 µm or less.

[21] The method for producing iron powder according to any one of the items [18] to [20] wherein the pulverizing step is performed to make a volume based 90% cumulative particle diameter of the iron powder measured by a Microtrac particle size distribution measuring equipment of 2.0 µm or less.

[22] The method for producing iron powder according to anyone of the items [17] to [21], wherein the iron powder has a real part $\mu'$ of a complex relative permeability of 4 or more and a loss factor tan $\delta$ of a complex relative permeability of 0.025 or less, measured at 100 MHz, for a molded article obtained by mixing the silicon oxide-coated iron powder and a bisphenol F type epoxy resin at a mass ratio of 9/1 and pressure-molding the mixture.

[23] A molded article for an inductor, containing the iron powder according to any one of the items [1] to [5].

[24] A molded article for an inductor, containing the silicon oxide-coated iron powder according to any one of the items [6] to [9].

[25] An inductor containing the iron powder according to any one of the items [1] to [5].

[26] An inductor containing the silicon oxide-coated iron powder according to any one of the items [6] to [9].

Advantageous Effects of Invention

According to the production methods of the invention, iron powder and silicon oxide-coated iron powder that have a large real part $\mu'$ of a complex relative permeability and a small loss factor ($\tan \delta$) of a complex relative permeability can be produced.

BRIEF DESCRIPTION OF DRAWINGS

FIG. 1 is a scanning electron microscope (SEM) micrograph of the iron oxide powder obtained by removing the silicon oxide coating from the silicon oxide-coated iron oxide powder obtained in Example 1.

FIG. 2 is a scanning electron microscope (SEM) micrograph of the iron oxide powder obtained by removing the silicon oxide coating from the silicon oxide-coated iron oxide powder obtained in Comparative Example 1.

FIG. 3 is a scanning electron microscope (SEM) micrograph of the iron powder obtained in Example 10.

DESCRIPTION OF EMBODIMENTS

In the production of iron powder as a magnetic material according to the invention, such a method is employed that a hydrated oxide precipitate that is obtained by neutralizing an acidic aqueous solution containing a trivalent iron ion with an alkali according to a wet method excellent in productivity is heated and dehydrated to produce iron oxide powder as a precursor, and the iron oxide powder is reduced to provide the target iron powder. The production of atomized powder requires a high pressure equipment, such as a compressor, for generating a high speed gas flow or liquid flow, and the production of carbonyl iron powder requires a large scale equipment for performing distillation and evaporation of carbonyl iron, but the wet method does not require a large scale equipment, such as in the production equipment for atomized powder and carbonyl iron powder.

The particle diameter distribution of the iron oxide powder obtained by the wet method can be uniformed to a certain extent in such a manner that a silane compound is added to a slurry containing a hydrated oxide precipitate formed through neutralization reaction, and thereby hydrolysis reaction of the silane compound to coat the hydrated oxide precipitate with the hydrolysate, followed by heating, but a method for controlling the particle diameter itself of the iron oxide powder to a desired value has not yet been known.

The silicon oxide coating itself is still coated on the iron powder even after reducing the iron oxide powder to the iron powder. Therefore, in an application where iron powder coated with an insulating coating is used, such as an application where a molded article of pressed powder of the iron powder is used as a magnetic core, the silicon oxide coating can be used directly as the insulating coating, without necessity of separate formation of the insulating coating, and this point can be considered as one of the advantages of the invention. In an application where there is no necessity of an insulating coating, the iron oxide powder is reduced to iron powder, which is then used after removing the silicon oxide coating.

The hydrolysate of the silane compound coated on the hydrated oxide precipitate is changed to a silicon oxide through dehydration condensation by the subsequent heat treatment, but may not be necessarily changed to silicon oxide ($SiO_2$) with the stoichiometric composition according to the heating condition, and there are cases where the OH groups forming the hydrolysate of the silane compound partially remain, and the organic groups derived from the silane compound partially remain. In the invention, the materials having the OH groups and the organic groups partially remaining and the materials having the phosphorus-containing ion derived from the reaction solution are generically referred to as a silicon oxide.

According to the preliminary investigations made by the present inventors, when the average particle diameter of the iron powder is increased, is increased associated therewith. It has been found that in the case where the average particle diameter of the iron particles measured with a scanning electron microscope is 0.25 μm or more, $\mu'$ becomes 2 or more, which is practically used. As for $\tan \delta$ the average particle diameter of the iron oxide that is 1 μm or more is not preferred since $\tan \delta$ is increased due to the large eddy current loss of the silicon oxide-coated iron powder after the reduction treatment.

As a result of the detailed studies made by the inventors, it has been found that the average particle diameter of the iron oxide particles in the silicon oxide-coated iron oxide powder particles can be controlled in a manner that a phosphorus-containing ion is made to coexist in the aqueous solution in the process of forming the precipitate of the hydrated oxide, and then the hydrolysate of the silane compound is coated, or in a manner that a phosphorus-containing ion is added during the addition of the silane compound for coating the hydrolysate, and then the iron oxide particles are grown through baking.

The mode of the coexistence of the phosphorus-containing ion may be any of a method that the phosphorus-containing ion is added to the acidic aqueous solution containing a trivalent Fe ion as the starting substance of reaction, and the solution is neutralized with an alkali to form a precipitate of a hydrated oxide of iron, a method that the acidic aqueous solution containing a trivalent Fe ion is neutralized with an alkali to form a precipitate of a hydrated oxide of iron, and then the phosphorus-containing ion is added to the slurry containing the precipitate, and a method that the phosphorus-containing ion is added along with the silane compound during the period where the silane compound is coated on the precipitate of the hydrated oxide of iron.

By performing a heat treatment after coating the hydrolysate of the silane compound on the precipitate of the hydrated oxide of iron formed in the presence of the phosphorus-containing ion, or after adding the phosphorus-containing ion during the addition of the silane compound and coating the silane compound on the precipitate of the hydrated oxide of iron, the silicon oxide-coated iron oxide powder containing iron oxide powder having a larger average particle diameter than in the case where no phosphorus-containing ion coexists can be obtained, and the silicon oxide-coated iron powder containing iron powder having a large average particle diameter can be finally obtained by reducing the silicon oxide-coated iron oxide powder. The silicon oxide coating may be partially removed for providing target magnetic characteristics. Furthermore, pure iron powder having no coating can be obtained by completely removing the silicon oxide coating.

Although the mechanism of the increase of the average particle diameter of the iron oxide after the heat treatment by performing the heat treatment after coating the hydrolysate of the silane compound on the precipitate of the hydrated oxide of iron formed in the coexistence of the phosphorus-containing ion is not clear at the present time, it is considered that there are such mechanisms, for example, that the phosphorus-containing ion is adsorbed to the surface of the precipitate to change the isoelectric point, and thereby the aggregation state of the precipitate is changed, or the silicon oxide and the phosphorus-containing ion are reacted to change the properties of the silicon oxide coating. The invention has been completed based on the aforementioned knowledge relating to the addition of the phosphorus-containing ion.

Iron Particles and Precursor

The magnetic iron particles contained in the iron powder and the silicon oxide-coated iron powder obtained in the invention are particles of substantially pure iron except for impurities that are unavoidably incorporated therein due to the production process thereof. The iron particles preferably have an average particle diameter of 0.25 µm or more and 0.80 µm or less and an average axial ratio of 1.5 or less. By achieving the ranges of the average particle diameter and the average axial ratio, both a large $\mu'$ and a sufficiently small tan $\delta$ can be achieved. The average particle diameter that is less than 0.25 µm is not preferred since $\mu'$ becomes small. The average particle diameter that exceeds 0.80 µm is not preferred since tan $\delta$ is increased associated with the increase of the eddy current loss. It is more preferred that the average particle diameter is 0.30 µm or more and 0.65 µm or less, and it is further preferred that the average particle diameter is 0.40 µm or more and 0.65 µm or less. The average axial ratio that exceeds 1.5 is not preferred since $\mu'$ is decreased associated with the increase of the magnetic anisotropy. While there is no particular lower limit for the average axial ratio, the iron powder having an average axial ratio of 1.29 or more is generally obtained. The variation coefficient of the average axial ratio may be, for example, 0.10 or more and 0.25 or less.

The amount of the silicon oxide coated on the silicon oxide-coated iron powder of the invention is preferably 15% by mass or less based on the total mass of the silicon oxide-coated iron powder from the standpoint of the increase of $\mu'$ by suppressing the proportion of the non-magnetic component.

The silicon oxide-coated iron powder of the invention preferably has a content of P of 0.1% by mass or more and 2.0% by mass or less, more preferably 0.1% by mass or more and 1.5% by mass or less, and further preferably 0.2% by mass or more and 1.0% by mass or less, based on the total mass of the silicon oxide-coated iron powder. P contained does not contribute to the enhancement of the magnetic characteristics, but the content thereof in the aforementioned range is allowable.

The iron powder of the invention preferably has a content of P of 0.1% by mass or more and 1.0% by mass or less, more preferably 0.1% by mass or more and 0.7% by mass or less, and further preferably 0.15% by mass or more and 0.4% by mass or less, based on the mass of the iron powder. P contained does not contribute to the enhancement of the magnetic characteristics, but the content thereof in the aforementioned range is allowable. The content of iron in the iron powder of the invention may be, for example, 75% by mass or more and 95% by mass or less based on the mass of the iron powder.

The state where iron particles are coated with a silicon oxide means that at least a part of the surface of the iron particles is coated with a silicon oxide, and the coated state includes not only the state where the entire surface of the iron particles is coated, but also the state where a part of the surface of the iron particles is coated, and the surface of the iron particles is exposed in the other part. The state where the surface of the iron particles is coated with a silicon oxide can be confirmed, for example, by observing the particle surface or the particle cross section with SEM-EDX and performing elemental analysis.

In the invention, a molded article obtained by mixing the silicon oxide-coated iron powder and a bisphenol F type epoxy resin at a mass ratio of 9/1 and pressure-molding the mixture preferably has a real part $\mu'$ of the complex relative permeability of 2 or more, and more preferably 3 or more, and a loss factor tan $\delta$ of the complex relative permeability of 0.025 or less, and more preferably 0.015 or less, measured at 100 MHz. $\mu'$ that is less than 2 is not preferred since the effect of miniaturization of an electronic component represented by an inductor may become small. In the invention, the upper limit of $\mu'$ is not particularly limited.

In the invention, a molded article obtained by mixing the iron powder and a bisphenol F type epoxy resin at a mass ratio of 9/1 and pressure-molding the mixture preferably has a real part $\mu'$ of the complex relative permeability of 4 or more, and more preferably 5 or more, and a loss factor tan $\delta$ of the complex relative permeability of 0.025 or less, and more preferably 0.015 or less, measured at 100 MHz. $\mu'$ that is less than 4 is not preferred since the effect of miniaturization of an electronic component represented by an inductor may become small.

The volume based 50% cumulative particle diameter of the iron powder measured by a Microtrac particle size distribution measuring equipment will be then described. In the description herein, the volume based 50% cumulative particle diameter measured by a Microtrac particle size distribution measuring equipment may be referred to as D50 in some cases, the volume based 10% cumulative particle diameter measured by a Microtrac particle size distribution measuring equipment may be referred to as D10 in some cases, and the volume based 90% cumulative particle diameter measured by a Microtrac particle size distribution measuring equipment may be referred to as D90 in some cases.

The iron powder obtained by the production method of the invention has an average particle diameter (average primary particle diameter) that is controlled to 0.25 µm or more and 0.8 µm or more, which is a smaller range than the ordinary iron particles, for achieving a high $\mu'$ and a small tan $\delta$ which are the objects of the invention. As a result, the surface energy of the particles becomes large, which may provide a tendency of forming an aggregate having a secondary particle diameter of from several micrometers to several tens of micrometers.

In the application of the iron powder to a power inductor purpose or the like, it is considered that the packing density of the iron powder can be increased by using a mixture of iron powder having a large secondary particle diameter and iron powder having a small secondary particle diameter. This is to enhance the packing density by packing the iron powder having a small secondary particle diameter in the voids among the iron powder having a large secondary particle diameter in mixing, in which the secondary particle diameters of the iron powder are important factors. Known iron powder may be used as the iron powder having a large secondary particle diameter, for example, of 10 µm or more.

However, it has been difficult to provide the iron powder having a small secondary particle diameter, for example, of 2 μm or less, and as a result, there is a limit in the packing density of iron powder in the case where the iron powder is applied to the power inductor purpose or the like. In the case where iron powder having a small secondary particle diameter, for example, of 2 μm or less can be obtained, the iron powder is preferred since the packing density of iron powder can be enhanced from the ordinary value in the case where the iron powder is applied to the power inductor purpose or the like. Specifically, the iron powder having a small secondary particle diameter preferably has D50 of 1.2 μm or less, and more preferably 1.0 μm or less. D90 of the iron powder is preferably 2.0 μm or less, and more preferably 1.6 μm or less.

Starting Substance

In the production method of the invention, an acidic aqueous solution containing a trivalent Fe ion (which may be hereinafter referred to as a raw material solution) is used as the starting substance of the silicon oxide-coated iron oxide powder as a precursor. In the case where a divalent Fe ion is used as the starting substance instead of a trivalent Fe ion, a mixture containing a hydrated oxide of divalent iron, magnetite, and the like may be formed in addition to a hydrated oxide of trivalent iron as a precipitate, which causes fluctuation of the shape of the iron particles finally obtained, and consequently the iron powder and the silicon oxide-coated iron powder according to the invention may not be obtained. The acidic herein means that the solution has pH of less than 7. The supply source of the Fe ion is preferably a water-soluble inorganic acid salt, such as a nitrate salt, a sulfate salt, and a chloride, from the standpoint of the availability and the cost. By dissolving the Fe salt in water, the Fe ion is hydrolyzed, and the aqueous solution exhibits acidity. By adding an alkali to the acidic aqueous solution containing the Fe ion for neutralization, a precipitate of a hydrated oxide of iron is obtained. The hydrated oxide of iron herein is a substance represented by the general formula $Fe_2O_3 \cdot nH_2O$, which is FeOOH (iron oxyhydroxide) when n=1, and is $Fe(OH)_3$ (iron hydroxide) when n=3.

The Fe ion concentration in the raw material solution is not particularly limited in the invention, and is preferably 0.01 mol/L or more and 1 mol/L or less. The Fe ion concentration that is less than 0.01 mol/L is not economically preferred since the amount of the precipitate obtained in one time reaction is small. The Fe ion concentration that exceeds 1 mol/L is not preferred since the reaction solution tends to be gelled due to the quick formation of the precipitate of the hydrated oxide.

Phosphorus-Containing Ion

The features of the production method of the invention include that a phosphorus-containing ion is made to coexist in the formation of the precipitate of the hydrated oxide of iron, or a phosphorus-containing ion is added during the addition of the silane compound for coating the hydrolysate, and in both the cases, the phosphorus-containing ion coexists in the reaction system during the coating of the silane compound. The supply source of the phosphorus-containing ion may be phosphoric acid, ammonium phosphate, sodium phosphate, and a soluble phosphate salt ($PO_4^{3-}$) thereof, such as a monohydrogen salt and a dihydrogen salt. Phosphoric acid, which is a tribasic acid, is dissociated in three stages in an aqueous solution, and therefore can be in three existence forms, i.e., a phosphate ion, a dihydrogen phosphate ion, and a monohydrogen phosphate ion, and the existence form thereof is determined by pH of the aqueous solution but not by the kind of the chemical used as the supply source of the phosphate ion. Thus, the aforementioned ions containing a phosphate group are generically referred to as a phosphate ion. The supply source of the phosphate ion in the invention may be diphosphoric acid (pyrophosphoric acid), which is a condensed phosphoric acid. In the invention, instead of the phosphate ion ($PO_4^{3-}$), a phosphite ion ($PO_3^{3-}$) and a hypophosphite ion ($PO_2^{2-}$) having different oxidation numbers of P may also be used. These oxide ions containing phosphorus (P) are generically referred to as a phosphorus-containing ion.

The amount of the phosphorus-containing ion added to the raw material solution is preferably 0.003 or more and 0.1 or less in terms of molar ratio with respect to the total molar amount of Fe contained in the raw material solution (P/Fe ratio). In the case where the P/Fe ratio is less than 0.003, the effect of increasing the average particle diameter of the iron oxide powder contained in the silicon oxide-coated iron oxide powder may be insufficient, and in the case where the P/Fe ratio exceeds 0.1, the effect of increasing the particle diameter cannot be obtained while the mechanism therefor is unclear. The value of the P/Fe ratio is more preferably 0.005 or more and 0.05 or less.

As described in the foregoing, the time of the addition of the phosphorus-containing ion to the raw material solution may be any of before the neutralization treatment described later, before the silicon oxide coating and after the neutralization treatment, and during the addition of the silane compound.

Neutralization Treatment

In a first embodiment of the production method of the invention, an alkali is added to the raw material solution containing the phosphorus-containing ion under stirring with known mechanical means, and the solution is neutralized to the pH thereof becoming 7 or more and 13 or less, so as to form a precipitate of a hydrated oxide of iron. The pH after the neutralization that is less than 7 is not preferred since an iron ion may not be precipitated as the hydrated oxide of iron. The pH after the neutralization that exceeds 13 is also not preferred since the hydrolysis rate of the silane compound added in the silicon oxide coating step may be large, and the coating of the hydrolysate of the silane compound may be non-uniform.

In the production method of the invention, in the neutralization of the raw material solution containing the phosphorus-containing ion with an alkali, a method of adding the raw material solution containing the phosphorus-containing ion to an alkali may also be employed, instead of the method of adding an alkali to the raw material solution containing the phosphorus-containing ion.

The values of pH described herein each are a value measured with a glass electrode according to JIS Z8802. The values are measured with a pH meter having been calibrated with a suitable buffer solution corresponding to the pH range to be measured as a pH standard solution. The values of pH described herein each are a value obtained by directly reading the measured value shown by the pH meter compensated with a temperature compensated electrode under the reaction temperature condition.

The alkali used for the neutralization may be any of a hydroxide of an alkali metal or an alkaline earth metal, aqueous ammonia, and an ammonium salt, such as ammonium hydrogen carbonate, and aqueous ammonia and ammonium hydrogen carbonate are preferably used since these may be hard to form impurities after finally performing a heat treatment to convert the precipitate of the hydrated oxide of iron to the iron oxide. The alkali may be added in the form of solid to the aqueous solution of the starting substance, and is preferably added in the form of an aqueous solution from the standpoint of the securement of the uniformity of reaction.

After completing the neutralization reaction, the precipitate is aged by retaining the slurry containing the precipitate at that pH under stirring for from 5 minutes to 24 hours.

In the production method of the invention, the reaction temperature in the neutralization treatment is not particularly limited, and is preferably 10° C. or more and 90° C. or less. The reaction temperature that is less than 10° C. or exceeds 90° C. is not preferred in consideration of the energy cost required for controlling the temperature.

In a second embodiment of the production method of the invention, an alkali is added to the raw material solution under stirring with known mechanical means, and the solution is neutralized to the pH thereof becoming 7 or more and 13 or less, so as to form a precipitate of a hydrated oxide of iron. Thereafter, the phosphorus-containing ion is added to the slurry containing the precipitate during the process of aging the precipitate. The time of the addition of the phosphorus-containing ion may be immediately after the formation of the precipitate or during the aging.

The aging time and the reaction temperature of the precipitate in the second embodiment may be the same as those of the first embodiment.

In a third embodiment of the production method of the invention, an alkali is added to the raw material solution under stirring with known mechanical means, and the solution is neutralized to the pH thereof becoming 7 or more and 13 or less, so as to form a precipitate of a hydrated oxide of iron. Thereafter, the precipitate is aged. The time of the addition of the phosphorus-containing ion will be described later.

Coating with Hydrolysate of Silane Compound

In the production method of the invention, the precipitate of the hydrated oxide of iron formed through the preceding steps is coated with a hydrolysate of a silane compound. The method used for coating the hydrolysate of the silane compound is preferably a so-called sol-gel method.

In the sol-gel method, the silane compound, such as a silicon compound having a hydrolyzable group, e.g., tetraethoxysilane (TEOS) and tetramethoxysilane (TMOS), and various silane coupling agents, is added to the slurry of the precipitate of the hydrated oxide of iron, so as to cause hydrolysis reaction under stirring, and the surface of the precipitate of the hydrated oxide of iron is coated with the hydrolysate of the silane compound thus formed. At this time, an acid catalyst or an alkali catalyst may be added, and the catalyst is preferably used in consideration of the treatment time. Representative examples thereof include hydrochloric acid for the acid catalyst, and ammonia for the alkali catalyst. In the case where the acid catalyst is used, the amount thereof added is necessarily restricted to such an amount that the precipitate of the hydrated oxide of iron is not dissolved.

Instead of the coating with the hydrolysate of the si lane compound, sodium silicate (liquid glass), which is an inorganic silicon compound, may be coated.

The ratio of the total molar number of the trivalent iron ion charged in the raw material solution and the total molar number of Si contained in the silicone compound added dropwise to the slurry (Si/Fe ratio) is preferably 0.05 or more and 0.5 or less. In the case where the Si/Fe ratio is less than 0.05, there is a possibility that the silicon oxide coating becomes incomplete, and in the case where the Si/Fe ratio exceeds 0.5, the amount of the silicon oxide as a nonmagnetic component may be increased to decrease $\mu'$. The Si/Fe ratio is more preferably 0.1 or more and 0.4 or less, and the Si/Fe ratio is further preferably 0.15 or more and 0.4 or less.

The specific method for coating the hydrolysate of the silane compound may be the same as a sol-gel method in a known process. For example, the reaction temperature for coating the hydrolysate of the silane compound by a sol-gel method may be 20° C. or more and 60° C. or less, and the reaction time therefor may be 1 hour or more and 20 hours or less.

In the third embodiment of the production method of the invention, the phosphorus-containing ion is simultaneously added to the slurry containing the precipitate of the hydrated oxide of iron obtained through the aging after the neutralization, during the period of from the start of addition of the silicon compound having a hydrolyzable group to the end of addition thereof. The time of the addition of the phosphorus-containing ion may be simultaneously with the start of addition of the silicon compound having a hydrolyzable group or simultaneously with the end of addition thereof.

Recovery of Precipitate

The precipitate of the hydrated oxide of iron coated with the hydrolysate of the silane compound is separated from the slurry obtained through the preceding steps. The solid-liquid separation method used may be a known solid-liquid separation method, such as filtration, centrifugal separation, and decantation. In the solid-liquid separation, an aggregating agent may be added for the solid-liquid separation.

Subsequently, it is preferred that the precipitate of the hydrated oxide of iron coated with the hydrolysate of the silane compound obtained through the solid-liquid separation is washed and then again subjected to solid-liquid separation. The washing method used may be a known washing method, such as repulping washing. The precipitate of the hydrated oxide of iron coated with the hydrolysate of the silane compound finally recovered is subjected to a drying treatment. The drying treatment is performed to remove water attached to the precipitate, and may be performed at a temperature exceeding the boiling point of water, for example, approximately 110° C.

Heat Treatment

In the production method of the invention, the precipitate of the hydrated oxide of iron coated with the hydrolysate of the silane compound is subjected to a heat treatment, so as to provide silicon oxide-coated iron oxide powder as a precursor of silicon oxide-coated iron powder. The atmosphere of the heat treatment is not particularly limited, and may be the air atmosphere. The heating may be performed in a range approximately of 500° C. or more and 1,500° C. or less. The heat treatment temperature that is 500° C. or less is not preferred since particles may not be grown sufficiently. The temperature that exceeds 1,500° C. is not preferred since unnecessary growth of particles and sintering of particles may occur. The heating time may be controlled to a range of from 10 minutes to 24 hours. The heat treatment changes the hydrated oxide of iron to the iron oxide. The heat treatment temperature is preferably 800° C. or more and 1,250° C. or less, and more preferably 900° C. or more and 1,150° C. or less. In the heat treatment performed, the hydrolysate of the silane compound coated on the precipitate of the hydrated oxide of iron is also changed to the silicon oxide. The silicon oxide coating also has a function of preventing the precipitate of the hydrated oxide of iron from being sintered in the heat treatment.

Reductive Heat Treatment

In the production method of the invention, the silicon oxide-coated iron oxide powder as a precursor obtained through the preceding steps is subjected to a heat treatment in a reducing atmosphere, so as to provide silicon oxide-coated iron powder as the final target product. Examples of the gas forming the reducing atmosphere include hydrogen gas and a mixed gas of hydrogen gas and an inert gas. The temperature for the reductive heat treatment may be in a range of 300° C. or more and 1,000° C. or less. The temperature for the reductive heat treatment that is less than 300° C. is not preferred since the reduction of the iron oxide may be insufficient. With the temperature exceeding 1,000° C., the effect of reduction may be saturated. The heating time may be controlled to a range of from 10 to 120 minutes.

Stabilization Treatment

In general, iron powder obtained through a reductive heat treatment has a surface that is considerably chemically active, and has been frequently subjected to a stabilization treatment through gradual oxidation. The iron powder obtained by the production method of the invention has a surface coated with the silicon oxide, which is chemically inert, but there is a case where a part of the surface is not coated, and thus the iron powder is preferably subjected to a stabilization treatment to form an oxide protective layer on the part where the surface of the iron powder is exposed. Examples of the procedure of the stabilization treatment include the following method.

After replacing the atmosphere, to which the silicon oxide-coated iron powder after the reductive heat treatment is exposed, from the reducing atmosphere to an inert gas atmosphere, the oxygen concentration in the atmosphere is gradually increased, and oxidation reaction of the exposed part is performed at a temperature of from 20 to 200° C., preferably from 60 to 100° C. The inert gas used may be one or more kind of a gas component selected from a rare gas and nitrogen gas. The oxygen-containing gas used may be pure oxygen gas or the air. Water vapor may also be introduced along with the oxygen-containing gas. The oxygen concentration, where the silicon oxide-coated iron powder is retained at a temperature of from 20 to 200° C., preferably from 60 to 100° C., may be finally from 0.1 to 21% by volume. The oxygen-containing gas may be introduced continuously or intermittently. In the initial stage of the stabilization treatment, the period of time where the oxygen concentration is 1.0% by volume or less is preferably kept for 5.0 minutes or more.

Dissolution Treatment of Silicon Oxide Coating

The coating treatment with the hydrolysate of the silane compound rather lacks the strictness of control of the amount of coating of the silicon oxide coating, and therefore the amount of coating of the silicon oxide coating can be controlled by immersing the silicon oxide-coated iron powder after the stabilization treatment in an alkali solution. The silicon oxide coating itself is a non-magnetic substance, and therefore the magnetic characteristics of the silicon oxide-coated iron powder are enhanced by partially dissolving the silicon oxide coating. Furthermore, pure iron powder without coating can be obtained by removing the whole of the silicon oxide coating.

The amount of coating of the silicon oxide coating is preferably 15% by mass or less based on the total mass of the silicon oxide-coated iron powder. The amount of coating that exceeds 15% by mass is not preferred since the proportion of the non-magnetic silicon oxide coating is increased, and the permeability $\mu'$ may be decreased.

In the invention, good results may be obtained in the case where the content of P in the silicon oxide-coated iron powder is 0.1% by mass or more and 2.0% by mass or less based on the total mass of the silicon oxide-coated iron powder. This may suggest that the coexistence of P changes the properties of the silicon oxide coating, and the particle diameter of the iron particles finally obtained is changed.

The composition of the silicon oxide-coated iron powder is determined by the ICP atomic emission spectroscopic analysis after dissolving the iron powder for Fe and P, and by the gravimetric method for Si.

The alkali aqueous solution used for the dissolution treatment may be an ordinary alkali aqueous solution having been used industrially, such as sodium hydroxide solution, potassium hydroxide solution, and aqueous ammonia. In consideration of the treatment time, the pH of the treating solution is preferably 10 or more, and the temperature of the treating solution is preferably 60° C. or more and the boiling point or less.

Pulverization

The iron powder obtained through the dissolution treatment of the silicon oxide coating may be pulverized. The pulverization can decrease the volume based 50% cumulative particle diameter of the iron powder measured by a Microtrac particle size distribution measuring equipment. The pulverizing method used may be a known method, such as a pulverizer using a medium, such as a bead mill, and a pulverizer using no medium, such as a jet mill. In the method using a pulverizer using a medium, the particles of the resulting iron powder may be deformed to increase the axial ratio thereof, which may result in problems that the packing density of the iron powder is decreased in the production of a molded article in the subsequent step, and the magnetic characteristics of the iron powder are deteriorated. Accordingly, a pulverizer using no medium is preferably used, and particularly preferably, the pulverization is performed by using a jet mill pulverizer. The jet mill pulverizer referred herein means a pulverizer of the type in which a material to be pulverized or a slurry containing a material to be pulverized and a liquid mixed therein is sprayed with a high pressure gas and made to collide with a collision plate or the like. The type thereof in which a material to be pulverized is sprayed with a high pressure gas without the use of a liquid is referred to as a dry jet mill pulverizer, and the type thereof in which a slurry containing a material to be pulverized and a liquid mixed therein is used is referred to as a wet jet mill pulverizer. The object, with which the material to be pulverized or the slurry containing the material to be pulverized and a liquid mixed therein is made to collide, may not be a stationary object, such as a collision plate, and such a method may be employed that materials to be pulverized are sprayed with a high pressure gas and made to collide with each other, or slurries each containing a material to be pulverized and a liquid mixed therein are made to collide with each other.

The liquid used for performing the pulverization with the wet jet mill pulverizer may be a general dispersion medium, such as pure water and ethanol, and ethanol is preferably used.

In the case where the wet jet mill pulverizer is used for the pulverization, a slurry after the pulverization treatment, which is a mixture of the pulverized iron powder and the dispersion medium, is obtained, and the dispersion medium in the slurry is evaporated to provide the pulverized iron powder. The drying method used may be a known method, and the atmosphere therefor may be the air. From the standpoint of the prevention of oxidation of the iron powder, drying in a non-oxidative atmosphere, such as nitrogen gas, argon gas, or hydrogen gas, and vacuum drying are preferably performed. The drying is preferably performed under heating, for example to 100° C. or more for increasing the drying rate. In the case where the iron powder obtained after drying is again mixed with ethanol and subjected to the Microtrac particle size distribution measurement, the D50 of the iron powder in the slurry after the pulverization treatment can be substantially reproduced. In other words, the D50 of the iron powder is not changed before and after drying.

Particle Diameter

The particle diameter of the iron particles constituting the silicon oxide-coated iron powder and the particle diameter of the iron oxide particles constituting the silicon oxide-coated iron oxide powder are measured in such a manner that the silicon oxide coating is dissolved and removed with a 10% by mass sodium hydroxide aqueous solution, and the particle diameter is measured by observation with a scanning electron microscope (SEM).

The dissolution removal of the silicon oxide may be performed in such a manner that the silicon oxide-coated iron powder or the silicon oxide-coated iron oxide powder is placed in a 10% by mass sodium hydroxide aqueous solution at 60° C., and after stirring for 24 hours, the iron powder or the iron oxide powder is filtered, washed with water and dried. The amount of the sodium hydroxide aqueous solution may be 0.8 L per 5 g of the silicon oxide-coated iron powder or the silicon oxide-coated iron oxide powder.

The iron powder or the iron oxide powder was observed with an SEM after the dissolution removal of the silicon oxide, and for one of the particles, the diameter of the minimum circle surrounding the particle is designated as the particle diameter (major diameter) of the particle. Specifically, in an SEM micrograph obtained with a magnification of approximately from 3,000 to 30,000, 300 particles are randomly selected from the particles having outer peripheries observed, and measured for the particle diameter, and the average value thereof is designated as the average particle diameter of the iron particles constituting the silicon oxide-coated iron powder or the iron oxide particles constituting the silicon oxide-coated iron oxide powder. The particle diameter obtained by the measurement is a primary particle diameter.

Axial Ratio

For one of the particles on an SEM micrograph, the length of the longest portion measured in the direction perpendicular to the aforementioned major diameter is designated as a minor diameter, and the ratio of (major diameter)/(minor diameter) is designated as the axial ratio of the particle. The average axial ratio, which is the axial ratio averaged over the powder, can be obtained in the following manner. 300 particles randomly selected from the SEM observation were measured for the major diameter and the minor diameter, the average value of the major diameters and the average value of the minor diameters of all the particles measured are designated as the average major diameter and the average minor diameter respectively, and the ratio of (average major diameter)/(average minor diameter) is designated as the average axial ratio. The coefficient of variation as an index showing the extent of variation can be calculated for each of the major diameter, the minor diameter, and the axial ratio.

Magnetic Characteristics

A B-H curve is measured by using VSM (VSM-P7, produced by Toei Industry Co., Ltd.) at an application magnetic field of 795.8 kA/m (10 kOe), and the coercive force Hc, the saturation magnetization σs, and the squareness ratio SQ are evaluated.

Complex Permeability

The iron powder or the silicon oxide-coated iron powder and a bisphenol F type epoxy resin (one-component epoxy resin B-1106, produced by Tesk Co., Ltd.) are weighed at a mass ratio of 90/10, and kneaded with a vacuum mixing-degassing mixer (V-mini300, produced by EME Corporation), so as to provide a paste having the specimen powder dispersed in the epoxy resin. The paste is dried on a hot plate at 60° C. for 2 hours to provide a composite of the metal powder and the resin, which is then pulverized into a powder form to provide composite powder. 0.2 g of the composite powder is placed in a torus shaped vessel and applied with a load of 9,800 N (1 ton) with a hand pressing machine, so as to provide a molded article having a toroidal shape with an outer diameter of 7 mm and an inner diameter of 3 mm. The molded article is measured for the real part μ' and the imaginary part μ" of the complex relative permeability at 100 MHz with an RF impedance material analyzer (E4991A, produced by Agilent Technologies, Inc.) and a test fixture (16454A, produced by Agilent Technologies, Inc.), and the loss factor $\tan \delta = \mu''/\mu'$ of the complex relative permeability is obtained.

The molded article produced by using the iron powder of the invention exhibits an excellent complex relative permeability and can be favorably used as a magnetic core of an inductor, and the like.

BET Specific Surface Area

The BET specific surface area is measured by the BET one point method with Macsorb model 1210, produced by Mountech Co., Ltd.

Microtrac Particle Size Distribution Measurement

For the measurement of the volume based 50% cumulative particle diameter and the volume based 90% cumulative particle diameter of the iron powder with a Microtrac measuring equipment, Microtrac particle size distribution measuring equipment, MT3300 EXII, produced by MicrotracBEL Corporation is used. The liquid placed in the specimen circulator of the measuring equipment is ethanol. For the form of the slurry containing the iron powder and ethanol or pure water mixed therein, the slurry is stirred immediately before supplying, to such an extent that no non-uniform portion is visually recognized, and then supplied to the measuring equipment.

EXAMPLES

Example 1

In a 5 L reaction vessel, 566.47 g of iron(III) nitrate nonahydrate having a purity of 99.7% by mass and 1.39 g of 85% by mass $H_3PO_4$ as a supply source of the phosphorus-containing ion were dissolved in 4,113.24 g of pure water in the air atmosphere under mechanically stirring with a stirring blade (procedure 1). The solution had pH of approximately 1. Under the condition, the P/Fe ratio was 0.0086.

In the air atmosphere, the charged solution was mechanically stirred with a stirring blade under a condition of 30° C., to which 409.66 g of a 23.47% by mass ammonia solution was added over 10 minutes (approximately 40 aim), and after completing the dropwise addition, the mixture was stirred for 30 minutes for aging the precipitate. At this time, the slurry containing the precipitate had pH of approximately 9 (procedure 2).

To the slurry obtained in the procedure 2 under stirring, 55.18 g of tetraethoxysilane (TEOS) having a purity of 95.0% by mass was added dropwise in the air at 30° C. over 10 minutes. Thereafter, the mixture was continuously stirred for 20 hours, so as to coat the precipitate with the hydrolysate of the silane compound formed through hydrolysis (procedure 3). Under the condition, the Si/Fe ratio was 0.18.

The slurry obtained in the procedure 3 was filtered, and after draining water as much as possible from the resulting precipitate coated with the hydrolysate of the silane compound, the precipitate was again dispersed in pure water for repulping washing. The slurry after washing was again filtered, and the resulting cake was dried in the air at 110° C. (procedure 4).

The dried product obtained in the procedure 4 was subjected to a heat treatment in the air at 1,050° C. with a box baking furnace, so as to provide silicon oxide-coated iron oxide powder (procedure 5). A specimen was collected from the silicon oxide-coated iron oxide powder obtained in the procedure 5, and after removing the silicon oxide coating in the manner described above, observed with an SEM, and the average particle diameter and the average axial ratio of the iron oxide powder were measured. The result of the SEM observation is shown in FIG. 1, the production conditions including the charging condition of the raw material solution are shown in Table 1, and the measurement results are shown in Table 2. The length shown by the 11 white vertical lines in the right lower portion of the SEM micrograph is 1.00 μm (which is the same as in FIG. 2).

The silicon oxide-coated iron oxide powder obtained in the procedure 5 was placed in an air permeable bucket, and the bucket was placed in a through type reducing furnace and retained at 630° C. for 40 minutes with hydrogen gas flowing inside the furnace, thereby performing the reductive heat treatment (procedure 6).

Subsequently, the atmospheric gas inside the furnace was replaced from hydrogen to nitrogen, and the temperature in the furnace was decreased to 80° C. at a temperature decreasing rate of 20° C./min with nitrogen gas flowing. Thereafter, as an initial gas for performing the stabilization treatment, a gas obtained by mixing nitrogen gas and the air to make a volume ratio of (nitrogen gas)/(air) of 125/1 (oxygen concentration: approximately 0.17% by volume) was introduced into the furnace to start oxidation reaction of the surface layer portion of the metal powder particles, and after gradually increasing the mixing ratio of the air, finally, a mixed gas having a volume ratio of (nitrogen gas)/(air) of 25/1 (oxygen concentration: approximately 0.80% by volume) was continuously introduced into the furnace, so as to form an oxide protective layer on the surface layer portion of the particles. During the stabilization treatment, the temperature was retained to 80° C., and the flow amount of the gas introduced was also retained substantially constant (procedure 7).

The silicon oxide-coated iron powder obtained through the aforementioned sequence of procedures was measured for the magnetic characteristics, the BET specific surface area, and the particle diameter and the complex permeability of the iron particles. The measurement results are shown in Table 2.

The iron oxide powder obtained until the procedure 5 in Example 1 had an average particle diameter of 0.59 μm and an average axial ratio of 1.35, and the reduction thereof provided iron powder having an average particle diameter of 0.54 μm and an average axial ratio of 1.34. The silicon oxide-coated iron powder obtained in Example 1 had μ' of 4.38 and tan δ of 0.014, which were better values than μ' of 1.61 and tan δ of 0.413 for the silicon oxide-coated iron powder obtained in Comparative Example 1 described later, in which the phosphorus-containing ion did not coexist in the formation of the precipitate of the hydrated oxide of iron, and thus the effect of the coexistence of the phosphorus-containing ion as the feature of the production method of the invention was clarified.

The molded article produced by using the iron powder of the invention exhibited excellent complex permeability characteristics, from which it was understood that the molded article was favorable as a magnetic core of an inductor.

Examples 2 to 5

Silicon oxide-coated iron oxide powder and silicon oxide-coated iron powder were obtained in the same procedures as in Example 1 except that the addition amount of Fe(III) ion was not changed, and the P/Fe ratio and the Si/Fe ratio were changed. The average particle diameter and the average axial ratio of the resulting iron oxide powder, and the magnetic characteristics, the BET specific surface area, and the complex permeability of the silicon oxide-coated iron powder are shown in Table 2. In all the examples, the values of μ' and tan δ were better than those of the comparative example. In all the examples and the comparative examples below, the addition amount of Fe(III) ion was constant.

Example 6

Silicon oxide-coated iron oxide powder and silicon oxide-coated iron powder were obtained in the same procedures as in Example 1 except that the phosphorus-containing ion was not added to the raw material solution, but phosphoric acid was added after 10 minutes from the start of aging, and then the aging was performed for 20 minutes. The SEM observation result of the iron oxide powder is shown in FIG. 2, and the average particle diameter and the average axial ratio thereof, and the magnetic characteristics, the BET specific surface area, and the complex permeability of the silicon oxide-coated iron powder are shown in Table 1. The silicon oxide-coated iron powder obtained in this example had of 4.38 and tan δ of 0.016, which were better than those of the comparative example, and thus it was understood that the effect of the invention was obtained in the case where the phosphorus-containing ion was added in the course of the aging of the precipitate of the hydrated oxide of iron.

Comparative Example 1

Silicon oxide-coated iron oxide powder and silicon oxide-coated iron powder were obtained in the same procedures as in Example 1 except that the phosphorus-containing ion was not added to the raw material solution. The SEM observation result of the iron oxide powder is shown in FIG. 2, and the average particle diameter and the average axial ratio thereof, and the magnetic characteristics, the BET specific surface area, and the complex permeability of the silicon oxide-coated iron powder are shown in Table 1. The silicon oxide-coated iron powder obtained in this comparative example had μ' of 1.61 and tan δ of 0.413, which were inferior to those of the examples.

Examples 7 to 10

As Example 7, silicon oxide-coated iron powder produced under the same conditions as in Example 1 was immersed in a 5% by mass sodium hydroxide aqueous solution at 60° C. for 1 hour, so as to dissolve a part of the silicon oxide coating. As a result, the Si content of the silicon oxide-coated iron powder was decreased from 7.72% by mass in Example 1 to 4.15% by mass, the permeability μ' was increased from 4.38 to 5.83, and the value of tan δ was substantially not changed. Example 8 was the result obtained by replacing the alkali aqueous solution in Example 7 to a 10% by mass sodium hydroxide aqueous solution, in which the Si content was further decreased to 2.73% by mass, and the permeability µ' was increased to 6.63. Example 9 was the result obtained by dissolving a part of the silicon oxide coating of the silicon oxide-coated iron powder produced under the same conditions as in Example 4, in which the permeability µ' was increased associated with the decrease of the Si content, as compared to Example 1.

Example 10 was the result obtained by changing the immersion time in the alkali aqueous solution to 24 hours under the same conditions as in Example 9. In this case, the silicon oxide coating was completely dissolved, and the permeability µ' was 6.55, and the value of tan δ was 0.015.

The SEM observation result of the iron powder obtained in Example 10 is shown in FIG. 3. In this case, the length shown by the 11 white vertical lines in the right lower portion of the SEM micrograph is 10.0 µm. The SEM micrograph in FIG. 3 was used for measuring the particle diameter and the axial ratio of the iron particles constituting the iron powder obtained in Example 10.

Example 11

In a 45 L reaction vessel, 4.96 kg of iron(III) nitrate nonahydrate having a purity of 99.7% by mass and 0.02 kg of 85% by mass $H_3PO_4$ were dissolved in 35.84 kg of pure water in the air atmosphere under mechanically stirring with a stirring blade (procedure 8). The solution had pH of approximately 1. Under the condition, the P/Fe ratio was 0.0173.

In the air atmosphere, the charged solution was mechanically stirred with a stirring blade under a condition of 30° C., to which 3.74 kg of a 22.50% by mass ammonia solution was added over 10 minutes (approximately 0.37 kg/m), and after completing the dropwise addition, the mixture was stirred for 30 minutes for aging the precipitate. At this time, the slurry containing the precipitate had pH of approximately 9 (procedure 9).

To the slurry obtained in the procedure 9 under stirring, 0.97 kg of tetraethoxysilane (TEOS) having a purity of 95.0% by mass was added dropwise in the air at 30° C. over 10 minutes. Thereafter, the mixture was continuously stirred for 20 hours, so as to coat the precipitate with the hydrolysate of the silane compound formed through hydrolysis (procedure 10). Under the condition, the Si/Fe ratio was 0.36.

The slurry obtained in the procedure 10 was filtered, and after draining water as much as possible from the resulting precipitate coated with the hydrolysate of the silane compound, the precipitate was again dispersed in pure water for repulping washing. The slurry after washing was again filtered, and the resulting cake was dried in the air at 110° C. (procedure 11).

The dried product obtained in the procedure 11 was subjected to a heat treatment in the air at 1,045° C. with a box baking furnace, so as to provide silicon oxide-coated iron oxide powder (procedure 12). The silicon oxide-coated iron oxide powder obtained in the procedure 12 was placed in an air permeable bucket, and the bucket was placed in a through type reducing furnace and retained at 630° C. for 40 minutes with hydrogen gas flowing inside the furnace, thereby performing the reductive heat treatment (procedure 13).

Subsequently, the atmospheric gas inside the furnace was replaced from hydrogen to nitrogen, and the temperature in the furnace was decreased to 80° C. at a temperature decreasing rate of 20° C./min with nitrogen gas flowing. Thereafter, as an initial gas for performing the stabilization treatment, a gas obtained by mixing nitrogen gas and the air to make a volume ratio of (nitrogen gas)/(air) of 125/1 (oxygen concentration: approximately 0.17% by volume) was introduced into the furnace to start oxidation reaction of the surface layer portion of the metal powder particles, and after gradually increasing the mixing ratio of the air, finally, a mixed gas having a volume ratio of (nitrogen gas)/(air) of 25/1 (oxygen concentration: approximately 0.80% by volume) was continuously introduced into the furnace, so as to form an oxide protective layer on the surface layer portion of the particles. During the stabilization treatment, the temperature was retained to 80° C., and the flow amount of the gas introduced was also retained substantially constant (procedure 14).

The silicon oxide-coated iron powder obtained in the procedure 14 was placed in a 20% by mass sodium hydroxide aqueous solution at 60° C., and after stirring for 24 hours, filtered, washed with water, and dried in nitrogen at 110° C. for 2 hours. The amount of the sodium hydroxide aqueous solution was a proportion of 3.2 L per 56 g of the silicon oxide-coated iron powder.

The silicon oxide-coated iron powder obtained through the aforementioned sequence of procedures was measured for the magnetic characteristics, the BET specific surface area, and the particle diameter and the complex permeability of the iron particles. The measurement results are shown in Table 2.

The resulting iron powder was mixed with ethanol to provide an iron powder-ethanol mixed slurry, which was subjected to an ultrasonic dispersion device for 5 minutes, and then measured for the volume based particle diameter with a Microtrac measuring equipment (Microtrac particle size distribution measuring equipment, MT3300 EXII, produced by MicrotracBEL Corporation). As a result, D10 was 0.71 µm, D50 was 1.60 µm, and D90 was 4.49 µm. In the Microtrac particle size distribution measurement, the slurry was stirred immediately before supplying, to such an extent that no non-uniform portion was visually recognized, and then supplied to the measuring equipment.

Example 12

Iron powder produced in the same procedures as in Example 11 was mixed with ethanol to provide an iron powder-ethanol mixed slurry having a content of the iron powder of 10% by mass. The iron powder-ethanol mixed slurry was pulverized with a jet mill pulverizer (Nanoatomizer G-smasher LM-1000, produced by RIX Corporation) to provide a slurry after pulverization. In the pulverization, the supplying rate of the iron powder-ethanol mixed slurry was 100 mL/min, the air pressure was 0.6 MPa, and the pulverization treatment was repeated 5 times. The resulting slurry after pulverization was measured for the volume based particle diameter with a Microtrac measuring equipment (Microtrac particle size distribution measuring equipment, MT3300 EXII, produced by MicrotracBEL Corporation). As a result, D10 was 0.51 µm, D50 was 0.83 µm, and D90 was 1.42 µm. The liquid placed in the specimen circulator of the measuring equipment was ethanol. In the Microtrac particle size distribution measurement, the slurry after pulverization was stirred immediately before supplying, to such an extent that no non-uniform portion was visually recognized, and then supplied to the measuring equipment. The slurry after pulverization was dried in nitrogen gas at 100° C. for 2 hours to provide iron powder of example 12. The resulting iron powder was measured for the magnetic characteristics, the BET specific surface area, and the particle diameter and the complex permeability of the iron particles. The measurement results are shown in Table 2. The resulting iron powder was mixed with ethanol and subjected to the Microtrac particle size distribution measurement, and as a result, the D50 of the iron powder in the slurry after pulverization was substantially reproduced.

Example 13

Iron powder produced in the same procedures as in Example 11 was mixed with pure water to provide an iron powder-pure water mixed slurry having a content of the iron powder of 10% by mass. The slurry was pulverized with a jet mill pulverizer (Nanoatomizer G-smasher LM-1000, produced by RIX Corporation) to provide a slurry after pulverization. In the pulverization, the supplying rate of the iron powder-pure water mixed slurry was 100 mL/min, the air pressure was 0.6 MPa, and the pulverization treatment was repeated 5 times. The resulting slurry after pulverization was measured for the volume based particle diameter with a Microtrac measuring equipment (Microtrac particle size distribution measuring equipment, MT3300 EXII, produced by MicrotracBEL Corporation). As a result, D10 was 0.66 µm, D50 was 1.13 µm, and D90 was 1.85 µm. The liquid placed in the specimen circulator of the measuring equipment was ethanol. In the Microtrac particle size distribution measurement, the slurry after pulverization was stirred immediately before supplying, to such an extent that no non-uniform portion was visually recognized, and then supplied to the measuring equipment. The slurry after pulverization was dried in nitrogen gas at 100° C. for 2 hours to provide iron powder of example 13. The resulting iron powder was measured for the magnetic characteristics, the BET specific surface area, and the particle diameter and the complex permeability of the iron particles. The measurement results are shown in Table 2. The resulting iron powder was mixed with ethanol and subjected to the Microtrac particle size distribution measurement, and as a result, the D50 of the iron powder in the slurry after pulverization was substantially reproduced.

It was understood from the results of Example 11 that in the case where the pulverization with the jet mill pulverizer was not performed, D50 was as large as 1.6 µm even though the iron powder was subjected to the ultrasonic dispersion treatment, and iron powder having D50 of 1.2 µm or less was not obtained, whereas in Examples 12 and 13 where the pulverization with the jet mill pulverizer was performed, D50 was able to be decreased to 1.2 µm or less. Furthermore, it was understood that by using ethanol as the liquid to be mixed with the material to be pulverized in the pulverization with the wet jet mill pulverizer, D50 was able to be smaller than the case where water was used as the liquid to be mixed with the material to be pulverized.

Comparative Example 2

As Comparative Example 2, silicon oxide-coated iron powder produced under the same conditions as in Comparative Example 1 was immersed in a 10% by mass sodium hydroxide aqueous solution at 60° C. for 24 hours to dissolve completely the silicon oxide coating. The iron powder obtained in this comparative example had values of µ' of 3.42 and tan δ of 0.064, which were inferior to those of Example 10.

Example 14

Silicon oxide-coated iron powder was obtained in the same procedures as in Example 1 except that 4.68 g of trisodium phosphate $Na_3PO_4$ dodecahydrate having a purity of 98% by mass was dissolved instead of phosphoric acid $H_3PO_4$. Under the condition, the P/Fe ratio was 0.0086. The production conditions including the charging condition of the raw material solution are shown in Table 1. The resulting silicon oxide-coated iron powder was measured for the magnetic characteristics, the BET specific surface area, and the (average) particle diameter and the complex permeability of the iron particles in the same procedures as in Example 1. The measurement results are shown in Table 2.

The silicon oxide-coated iron powder obtained in Example 14 had an average particle diameter of 0.39 µm and an average axial ratio of 1.32 of the iron particles. The silicon oxide-coated iron powder obtained in Example 14 had µ' of 3.53 and tan δ of 0.008.

Example 15

Silicon oxide-coated iron powder was obtained in the same procedures as in Example 1 except that 2.72 g of tetrasodium pyrophosphate $Na_4P_2O_7$ decahydrate having a purity of 99% by mass was dissolved instead of phosphoric acid $H_3PO_4$. Under the condition, the P/Fe ratio was 0.0086. The production conditions including the charging condition of the raw material solution are shown in Table 1. The resulting silicon oxide-coated iron powder was measured for the magnetic characteristics, the BET specific surface area, and the (average) particle diameter and the complex permeability of the iron particles in the same procedures as in Example 1. The measurement results are shown in Table 2.

The silicon oxide-coated iron powder obtained in Example 15 had an average particle diameter of 0.31 µm and an average axial ratio of 1.29 of the iron particles. The silicon oxide-coated iron powder obtained in Example 15 had µ' of 3.35 and tan δ of 0.004.

Example 16

Silicon oxide-coated iron powder was obtained in the same procedures as in Example 1 except that 1.02 g of phosphorous acid $H_3PO_3$ having a purity of 97% by mass was dissolved instead of phosphoric acid $H_3PO_4$. Under the condition, the P/Fe ratio was 0.0086. The production conditions including the charging condition of the raw material solution are shown in Table 1. The resulting silicon oxide-coated iron powder was measured for the magnetic characteristics, the BET specific surface area, and the (average) particle diameter and the complex permeability of the iron particles in the same procedures as in Example 1. The measurement results are shown in Table 2.

The silicon oxide-coated iron powder obtained in Example 16 had an average particle diameter of 0.45 µm and an average axial ratio of 1.31 of the iron particles. The silicon oxide-coated iron powder obtained in Example 15 had µ' of 4.35 and tan δ of 0.023.

Example 17

Silicon oxide-coated iron powder was obtained in the same procedures as in Example 1 except that the phosphorus-containing ion was not added to the raw material solution, and phosphoric acid was added after 5 minutes from the start of the dropwise addition of TEOS. Under the condition, the P/Fe ratio was 0.0086. The production conditions including the charging condition of the raw material solution are shown in Table 1. The resulting silicon oxide-coated iron powder was measured for the magnetic characteristics, the BET specific surface area, and the (average) particle diameter and the complex permeability of the iron particles in the same procedures as in Example 1. The measurement results are shown in Table 2.

The silicon oxide-coated iron powder obtained in Example 17 had an average particle diameter of 0.46 μm and an average axial ratio of 1.37 of the iron particles. The silicon oxide-coated iron powder obtained in Example 17 had μ' of 4.70 and tan δ of 0.024.

As a reference example, the magnetic characteristics, the BET specific surface area, and the complex permeability of the commercially available FeSiCr atomized powder are shown in Table 2.

TABLE 1

| | Production condition of precursor | | | | | Baking temperature (° C.) |
|---|---|---|---|---|---|---|
| | Raw material solution charging condition | | | | | |
| | Si/Fe | P/Si | P/Fe | P-containing ion | Time of addition of P | |
| Example 1 | 0.18 | 0.048 | 0.0086 | $H_3PO_4$ | after charging Fe (before alkali addition) | 1050 |
| Example 2 | 0.21 | 0.048 | 0.0101 | $H_3PO_4$ | after charging Fe (before alkali addition) | 1050 |
| Example 3 | 0.24 | 0.048 | 0.0115 | $H_3PO_4$ | after charging Fe (before alkali addition) | 1050 |
| Example 4 | 0.36 | 0.048 | 0.0173 | $H_3PO_4$ | after charging Fe (before alkali addition) | 1050 |
| Example 5 | 0.18 | 0.096 | 0.0173 | $H_3PO_4$ | after charging Fe (before alkali addition) | 1050 |
| Example 6 | 0.18 | 0.048 | 0.0086 | $H_3PO_4$ | after alkali addition (before silica coating) | 1050 |
| Example 7 | 0.18 | 0.048 | 0.0086 | $H_3PO_4$ | after charging Fe (before alkali addition) | 1050 |
| Example 8 | 0.18 | 0.048 | 0.0086 | $H_3PO_4$ | after charging Fe (before alkali addition) | 1050 |
| Example 9 | 0.36 | 0.048 | 0.0173 | $H_3PO_4$ | after charging Fe (before alkali addition) | 1050 |
| Example 10 | 0.36 | 0.048 | 0.0173 | $H_3PO_4$ | after charging Fe (before alkali addition) | 1050 |
| Example 11 | 0.36 | 0.048 | 0.0173 | $H_3PO_4$ | after charging Fe (before alkali addition) | 1045 |
| Example 12 | 0.36 | 0.048 | 0.0173 | $H_3PO_4$ | after charging Fe (before alkali addition) | 1045 |
| Example 13 | 0.36 | 0.048 | 0.0173 | $H_3PO_4$ | after charging Fe (before alkali addition) | 1045 |
| Example 14 | 0.18 | 0.048 | 0.0086 | $Na_3PO_4$ | after charging Fe (before alkali addition) | 1050 |
| Example 15 | 0.18 | 0.048 | 0.0086 | $Na_4P_2O_7$ | after charging Fe (before alkali addition) | 1050 |
| Example 16 | 0.18 | 0.048 | 0.0086 | $H_3PO_3$ | after charging Fe (before alkali addition) | 1050 |
| Example 17 | 0.18 | 0.048 | 0.0086 | $H_3PO_4$ | during TEOS addition | 1050 |
| Comparative Example 1 | 0.18 | 0 | 0 | | | 1050 |
| Comparative Example 2 | 0.18 | 0 | 0 | | | 1050 |

| | Si dissolution process | | | | Pulverization process | |
|---|---|---|---|---|---|---|
| | Presence of process | NaOH concentration (% by mass) | Treatment temperature (° C.) | Stirring time (h) | Presence of process | Solvent |
| Example 1 | no | — | — | — | no | — |
| Example 2 | no | — | — | — | no | — |
| Example 3 | no | — | — | — | no | — |
| Example 4 | no | — | — | — | no | — |
| Example 5 | no | — | — | — | no | — |
| Example 6 | no | — | — | — | no | — |
| Example 7 | yes | 5 | 60 | 1 | no | — |
| Example 8 | yes | 10 | 60 | 1 | no | — |
| Example 9 | yes | 10 | 60 | 1 | no | — |
| Example 10 | yes | 10 | 60 | 24 | no | — |
| Example 11 | yes | 20 | 60 | 24 | no | — |
| Example 12 | yes | 20 | 60 | 24 | yes | ethanol |
| Example 13 | yes | 20 | 60 | 24 | yes | water |
| Example 14 | no | — | — | — | no | — |
| Example 15 | no | — | — | — | no | — |
| Example 16 | no | — | — | — | no | — |
| Example 17 | no | — | — | — | no | — |
| Comparative Example 1 | no | — | — | — | no | — |
| Comparative Example 2 | yes | 10 | 60 | 24 | no | — |

TABLE 2

| | Power characteristics | | | | Iron oxide particles | | | | | |
|---|---|---|---|---|---|---|---|---|---|---|
| | Magnetic characteristics | | | | SEM observation result | | | | | |
| | Coercive force Hc (kA/m) | Saturation magnetization σs (Am²/kg) | SQ | BET specific surface area (m²/g) | Major diameter (μm) | Major diameter variation coefficient | Minor diameter (μm) | Minor diameter variation coefficient | Axial ratio | Axial ratio variation coefficient |
| Example 1 | 6.4 | 163.3 | 0.048 | 4.03 | 0.59 | 0.25 | 0.44 | 0.24 | 1.35 | 0.16 |
| Example 2 | 6.0 | 159.0 | 0.039 | 3.82 | 0.63 | 0.32 | 0.49 | 0.33 | 1.32 | 0.15 |
| Example 3 | 5.8 | 155.2 | 0.035 | 3.86 | 0.65 | 0.40 | 0.50 | 0.39 | 1.32 | 0.15 |
| Example 4 | 6.2 | 139.4 | 0.031 | 5.29 | 0.51 | 0.25 | 0.39 | 0.24 | 1.34 | 0.15 |
| Example 5 | 5.9 | 163.2 | 0.042 | 1.68 | 0.71 | 0.42 | 0.55 | 0.45 | 1.32 | 0.14 |
| Example 6 | 6.5 | 162.6 | 0.048 | 3.90 | 0.62 | 0.25 | 0.46 | 0.26 | 1.36 | 0.15 |
| Example 7 | 6.2 | 173.9 | 0.042 | 6.52 | 0.59 | 0.25 | 0.44 | 0.24 | 1.35 | 0.16 |
| Example 8 | 5.8 | 179.2 | 0.042 | 5.32 | 0.59 | 0.25 | 0.44 | 0.24 | 1.35 | 0.16 |
| Example 9 | 5.6 | 174.8 | 0.030 | 8.51 | 0.51 | 0.25 | 0.39 | 0.24 | 1.34 | 0.15 |
| Example 10 | 5.5 | 182.7 | 0.030 | 11.70 | 0.51 | 0.25 | 0.39 | 0.24 | 1.34 | 0.15 |
| Example 11 | 5.9 | 182.0 | 0.030 | 15.10 | | | | | | |
| Example 12 | 4.7 | 183.9 | 0.021 | 12.90 | | | | | | |
| Example 13 | 4.6 | 183.5 | 0.022 | 13.20 | | | | | | |
| Example 14 | 5.1 | 166.1 | 0.024 | 4.27 | | | | | | |
| Example 15 | 6.8 | 165.3 | 0.033 | 6.16 | | | | | | |
| Example 16 | 6.5 | 163.7 | 0.048 | 4.17 | | | | | | |
| Example 17 | 6.2 | 165.2 | 0.047 | 3.89 | | | | | | |
| Comparative Example 1 | 38.3 | 156.8 | 0.260 | 33.50 | 0.07 | 0.30 | 0.05 | 0.31 | 1.39 | 0.16 |
| Comparative Example 2 | 39.0 | 160.4 | 0.262 | 23.90 | | | | | | |
| Reference Example | 1.3 | 167.0 | 0.010 | 0.12 | | | | | | |

| | Iron particles | | | | | | Composition | | | Compound high frequency characteristics (100 MHz) | |
|---|---|---|---|---|---|---|---|---|---|---|---|
| | SEM observation result | | | | | | | Weight method | | | |
| | Major | | Minor | | | | ICP | ICP | | | |
| | Major diameter (μm) | diameter variation coefficient | Minor diameter (μm) | diameter variation coefficient | Axial ratio | Axial ratio variation coefficient | Fe (% by mass) | P (% by mass) | Si (% by mass) | Permeability μ' | Magnetic loss tanδ |
| Example 1 | 0.54 | 0.25 | 0.41 | 0.24 | 1.34 | 0.16 | 81.8 | 0.38 | 7.72 | 4.38 | 0.014 |
| Example 2 | 0.52 | 0.24 | 0.40 | 0.26 | 1.31 | 0.15 | 79.3 | 0.43 | 8.82 | 3.79 | 0.009 |
| Example 3 | 0.53 | 0.32 | 0.41 | 0.31 | 1.30 | 0.16 | 77.4 | 0.49 | 9.82 | 3.44 | 0.004 |
| Example 4 | 0.45 | 0.23 | 0.33 | 0.20 | 1.37 | 0.15 | 70.0 | 0.66 | 13.2 | 2.39 | <0.001 |
| Example 5 | 0.57 | 0.30 | 0.43 | 0.28 | 1.34 | 0.15 | 81.2 | 0.78 | 7.72 | 4.42 | 0.021 |
| Example 6 | 0.54 | 0.24 | 0.41 | 0.23 | 1.34 | 0.18 | 82.2 | 0.38 | 7.83 | 4.38 | 0.016 |
| Example 7 | 0.54 | 0.25 | 0.41 | 0.24 | 1.34 | 0.16 | 87.7 | 0.16 | 4.15 | 5.83 | 0.019 |
| Example 8 | 0.54 | 0.25 | 0.41 | 0.24 | 1.34 | 0.16 | 88.8 | 0.27 | 2.73 | 6.63 | 0.022 |
| Example 9 | 0.45 | 0.23 | 0.33 | 0.20 | 1.37 | 0.15 | 81.4 | 0.23 | 3.35 | 4.87 | 0.011 |
| Example 10 | 0.45 | 0.23 | 0.33 | 0.20 | 1.37 | 0.15 | 94.7 | 0.25 | <0.1 | 6.55 | 0.015 |
| Example 11 | 0.43 | 0.24 | 0.31 | 0.27 | 1.41 | 0.21 | 93.7 | 0.34 | 0.18 | 5.96 | 0.013 |
| Example 12 | 0.43 | 0.22 | 0.31 | 0.23 | 1.41 | 0.20 | 92.2 | 0.31 | 0.15 | 6.71 | 0.017 |
| Example 13 | 0.42 | 0.22 | 0.31 | 0.23 | 1.39 | 0.18 | 94.2 | 0.31 | 0.17 | 6.42 | 0.016 |
| Example 14 | 0.39 | 0.22 | 0.30 | 0.22 | 1.32 | 0.15 | 81.1 | 0.35 | 7.80 | 3.53 | 0.008 |
| Example 15 | 0.31 | 0.25 | 0.25 | 0.26 | 1.29 | 0.14 | 81.8 | 0.34 | 7.80 | 3.35 | 0.004 |
| Example 16 | 0.45 | 0.28 | 0.35 | 0.30 | 1.31 | 0.18 | 82.5 | 0.24 | 7.90 | 4.35 | 0.023 |
| Example 17 | 0.46 | 0.28 | 0.34 | 0.26 | 1.37 | 0.18 | 82.7 | 0.35 | 7.60 | 4.70 | 0.024 |
| Comparative Example 1 | | | | | | | 80.9 | — | 7.71 | 1.61 | 0.413 |
| Comparative Example 2 | | | | | | | 89.1 | — | <0.1 | 3.42 | 0.064 |
| Reference Example | | | | | | | | | | 9.23 | 0.174 |

The invention claimed is:

1. Iron powder comprising iron particles having an average particle diameter of 0.25 μm or more and 0.80 μm or less and an average axial ratio of 1.5 or less, wherein the iron powder has a content of P of 0.1% by mass or more and 0.7% by mass or less based on the mass of the iron powder, and further wherein the iron powder has a real part μ' of a complex relative permeability of 4 or more and a loss factor tan δ of a complex relative permeability of 0.025 or less, measured at 100 MHz, for a molded article obtained by mixing the iron powder and a bisphenol F epoxy resin at a mass ratio of 9/1 and pressure-molding the mixture, wherein the iron powder is observed with an SEM after a dissolution removal of silicon oxide, and for one of the iron particles, a diameter of a minimum circle surrounding the iron particle is designated as a particle diameter or major diameter of the iron particle, and in an SEM micrograph obtained with a magnification of approximately from 3,000 to 30,000, 300 particles are randomly selected from particles having outer peripheries observed, and measured for the iron particle or major diameter, and the average value thereof is designated as the average particle diameter of the iron particles, and wherein for one of the iron particles a length of a longest portion measured in a direction perpendicular to the major diameter is designated as a minor diameter of the iron particle, and in an SEM micrograph obtained with a magnification of approximately from 3,000 to 30,000, 300 particles are randomly selected from the iron particles having outer peripheries observed, and measured for major and minor diameters, and average values thereof are designated as average major and minor diameters of the iron articles and the average axial ratio, as average major diameter/average minor diameter, is calculated by dividing average major diameter by average minor diameter.

2. The iron powder according to claim 1, wherein the iron powder has a volume based 50% cumulative particle diameter measured by a Microtrac particle size distribution measuring equipment of 1.2 μm or less.

3. The iron powder according to claim 1, wherein the iron powder has a volume based 90% cumulative particle diameter measured by a Microtrac particle size distribution measuring equipment of 2.0 μm or less.

4. Silicon oxide-coated iron powder comprising the iron particles according to claim 1, having coated on a surface thereof a silicon oxide.

5. The silicon oxide-coated iron powder according to claim 4, wherein the silicon oxide-coated iron powder has an amount of the silicon oxide coated of 15% by mass or less in terms of silicon based on the total mass of the silicon oxide-coated iron powder.

6. The silicon oxide-coated iron powder according to claim 4, wherein the silicon oxide-coated iron powder has a content of P of 0.1% by mass or more and 2.0% by mass or less based on the total mass of the silicon oxide-coated iron powder.

7. A molded article for an inductor, comprising the iron powder according to claim 1.

8. A molded article for an inductor, comprising the silicon oxide-coated iron powder according to claim 4.

9. An inductor comprising the iron powder according to claim 1.

10. An inductor comprising the silicon oxide-coated iron powder according to claim 2.

11. The iron powder according to claim 1, wherein the iron powder has a content of P of 0.1% by mass or more and 0.49% by mass or less based on the mass of the iron powder.

* * * * *